(12) United States Patent  
Boks (10) Patent No.: US 11,447,044 B1
(45) Date of Patent: Sep. 20, 2022

(54) SEAT SUPPORT ASSEMBLY

(71) Applicant: Brunswick Corporation, Mettawa, IL (US)

(72) Inventor: Michael J. Boks, Grand Rapids, MI (US)

(73) Assignee: Brunswick Corporation, Mettawa, IL (US)

( * ) Notice: Subject to any disclaimer, the term of this patent is extended or adjusted under 35 U.S.C. 154(b) by 0 days.

(21) Appl. No.: 17/227,954

(22) Filed: Apr. 12, 2021

(51) Int. Cl.
*B60N 2/12* (2006.01)
*B60N 2/16* (2006.01)

(52) U.S. Cl.
CPC ............ *B60N 2/12* (2013.01); *B60N 2/1625* (2013.01)

(58) Field of Classification Search
CPC .... B60N 2/045; B60N 2/1625; B60N 2/1615; B60N 2/1635; B60N 2/12
See application file for complete search history.

(56) References Cited

U.S. PATENT DOCUMENTS

| | | | |
|---|---|---|---|
| 2,076,309 A * | 4/1937 | Le Grand | B60N 2/045 248/419 |
| 2,749,969 A | 6/1956 | Tatter | |
| 3,839,757 A | 10/1974 | Grimes | |
| 5,383,640 A | 1/1995 | Johnson et al. | |
| 5,553,920 A * | 9/1996 | Meschkat | B60N 2/0284 297/337 |
| 5,613,662 A * | 3/1997 | Blackmore | B60N 2/1625 248/371 |
| 5,636,884 A | 6/1997 | Ladetto et al. | |
| 5,975,508 A | 11/1999 | Beard | |
| 6,138,973 A | 10/2000 | Woodward | |
| 6,940,026 B2 | 9/2005 | Rundell et al. | |
| 7,017,872 B2 | 3/2006 | Hogle et al. | |
| 7,303,236 B2 | 12/2007 | Ritter et al. | |
| 7,364,234 B2 | 4/2008 | Begin et al. | |
| 7,490,905 B2 | 2/2009 | Ritter et al. | |
| 7,686,397 B2 | 3/2010 | Sahi | |
| 7,866,751 B2 | 1/2011 | Downey | |
| 7,938,377 B2 | 5/2011 | Draghici et al. | |
| 7,950,618 B1 | 5/2011 | Burer | |
| 8,292,368 B1 | 10/2012 | Yarbrough | |

(Continued)

FOREIGN PATENT DOCUMENTS

| | | | | |
|---|---|---|---|---|
| CN | 201525307 U | 7/2010 | | |
| CN | 109693587 A * | 4/2019 | ............ | B60N 2/1625 |

(Continued)

*Primary Examiner* — Milton Nelson, Jr.
(74) *Attorney, Agent, or Firm* — Andrus Intellectual Property Law, LLP (57) ABSTRACT

A seat support assembly has a lower member with a first channel extending in a front-back direction of the seat support assembly and an upper member positioned above the lower member and having a second channel extending in the front-back direction. A first linkage has a lower end pivotably coupled to the lower member and translatable in the front-back direction by way of the first channel and an upper end pivotably coupled to the upper member. A second linkage has a lower end pivotably coupled to the lower member and an upper end pivotably coupled to the upper member and translatable in the front-back direction by way of the second channel. The first and second channels are offset from one another in the front-back direction.

21 Claims, 6 Drawing Sheets

(56) References Cited

U.S. PATENT DOCUMENTS

| | | | |
|---|---|---|---|
| 8,444,203 B2 | 5/2013 | Ohtsubo | |
| 8,474,910 B2 | 7/2013 | Kammerer | |
| 8,540,316 B2 | 9/2013 | Deml et al. | |
| 8,590,971 B2 | 11/2013 | Ito et al. | |
| 8,864,232 B2 | 10/2014 | Hashimoto | |
| 9,120,410 B2 | 9/2015 | Bauman | |
| 9,242,703 B2 | 1/2016 | Nutz et al. | |
| 9,399,415 B2 | 7/2016 | Serber | |
| 9,604,550 B2 | 3/2017 | Ito | |
| 9,604,707 B2 | 3/2017 | Falck et al. | |
| 9,630,527 B2 | 4/2017 | Matsui | |
| 10,005,380 B2 | 6/2018 | Reid et al. | |
| 10,328,826 B2 | 6/2019 | Ramachandra et al. | |
| 10,377,281 B2 | 8/2019 | Pleskot | |
| 10,532,673 B2 | 1/2020 | Kemp et al. | |
| 10,752,139 B2 | 8/2020 | Plante et al. | |
| 10,773,613 B2 | 9/2020 | Nakamura et al. | |
| 2003/0218369 A1* | 11/2003 | Akaike | B60N 2/1625 297/344.15 |
| 2017/0080831 A1 | 3/2017 | Kaemmerer et al. | |

FOREIGN PATENT DOCUMENTS

| | | | | |
|---|---|---|---|---|
| DE | 19501521 A1 * | 7/1995 | | B60N 2/1846 |
| DE | 102011086751 A1 * | 5/2013 | | B60N 2/1615 |
| GB | 635957 | * 12/1947 | | B60N 2/045 |

\* cited by examiner

SEAT SUPPORT ASSEMBLY

FIELD

The present disclosure relates to seat support assemblies for supporting a seat above a support surface in an adjustable manner.

BACKGROUND

U.S. Pat. No. 6,138,973 discloses a seat pedestal comprised of a first tubular vertical support member attached to an underlying deck by a base member, a second tubular member telescoped within the first member, means for attaching a seat to the top of the second member, and means for adjusting the height of the second member within the first comprising a vertical slot in the second member and a plurality of vertically spaced horizontal radial slots intersecting and extending from the vertical slot and a stationary pin extending from the first member through the slot and about which the second member may be changed in height by positioning the pin selectively within one of the horizontal slots.

U.S. Pat. No. 7,017,872 discloses a pedestal assembly for supporting a seat including a first cylinder having an inner surface with a plurality of longitudinally-extending channels, and a second cylinder having an inner surface with a plurality of longitudinally-extending channels and an outer surface with a plurality of longitudinally-extending grooves. The assembly also includes a first bushing that is operably coupled to one end of the second cylinder by a plurality of fasteners received within an end of the channels of the second cylinder, and a second bushing that is operably coupled to one end of the first cylinder by a plurality of fasteners received within an end of the channels of the first cylinder. The second bushing includes a plurality of tabs slidably received within the channels on the inner surface of the first cylinder and is adapted to telescopingly guide the second cylinder within the first cylinder.

U.S. Pat. Nos. 7,303,236 and 7,490,905 disclose apparatuses for operation of a vehicle seat slider. A disclosed apparatus includes a cable assembly having a first end and a second end. The first end of the cable assembly is configured to be operatively coupled to a slider mechanism of a vehicle seat. A release member is operatively coupled to the second end of the cable assembly so that the slider mechanism is urged toward a locked condition in the absence of a force being applied to the release member by a person.

U.S. Pat. No. 7,364,234 discloses a swivel mechanism for a vehicle seat including a base plate configured to be fixed relative to the vehicle and to provide support to the vehicle seat. The vehicle seat is mounted to a seat mounting plate having a first side configured to receive the vehicle seat and a second side opposite the first side, mechanically coupled to the base plate. The seat mounting plate and the base plate are mechanically coupled so that when the seat mounting plate is rotated about an axis of the base plate the seat mounting plate translates in a plane that is substantially perpendicular to the axis of the base plate. A locking recess is formed in one of the base plate or the seat mounting plate, and is adapted to receive a locking pawl pivotably mounted to the opposite one of the base plate or the seat mounting plate. The locking recess is biased toward the locking recess such that when the locking pawl and locking recess are engaged, the seat mounting plate is inhibited from movement relative to the base plate.

U.S. Pat. No. 7,866,751 discloses an apparatus and methods to integrally form lever operated cables with vehicle seats. An example apparatus includes a channel integrally formed in a portion of a vehicle seat and a seat position control integrally coupled to the vehicle seat. A cable assembly slidably movable within the channel and has a first end operatively coupled to a seat position adjustment mechanism and a second end operatively coupled to the seat position control.

U.S. Pat. No. 7,938,377 discloses a seat slider. The slider seat includes a seat mount and a first slider guide extending along at least a portion of the perimeter of the seat mount. A second slider guide extends from the surface of the seat mount at a position distally located from the perimeter of the seat mount. A slider plate to which a vehicle seat can be mounted includes a first channel for slidably engaging the first slider guide and a second channel for slidably engaging the second slider guide such that the slider plate is slidable between a first position and a second position relative to the seat mount. A locking lever is movably coupled to the slider plate and includes a locking structure to prevent the slider plate from moving relative to the seat mount. A control member operatively coupled to the locking lever to cause the locking lever to move toward an unlocked position wherein the locking structure allows the slider plate to move relative to the seat mount. In some examples, a trim piece is adapted to at least partially cover fasteners mounting the assembly to a vehicle support surface.

The above-noted patents are hereby incorporated by reference herein in their entireties.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

According to one example of the present disclosure, a seat support assembly comprises a lower member comprising a first channel extending in a front-back direction of the seat support assembly and an upper member positioned above the lower member and comprising a second channel extending in the front-back direction. A first linkage has a lower end pivotably coupled to the lower member and translatable in the front-back direction by way of the first channel and an upper end pivotably coupled to the upper member. A second linkage has a lower end pivotably coupled to the lower member and an upper end pivotably coupled to the upper member and translatable in the front-back direction by way of the second channel. The first and second channels are offset from one another in the front-back direction.

According to another example, a seat support assembly comprises a lower member configured to be coupled to a supporting surface and an upper member configured to have a seat pan coupled thereto. A first linkage is pivotably coupled to the lower and upper members and translatable with respect to the lower and/or upper member in a front-back direction of the seat support assembly. A second linkage is pivotably coupled to the lower and upper members and translatable with respect to the lower and/or upper member in the front-back direction. By way of pivoting and/or translation of the first and/or second linkage with respect to the lower and/or upper member, the upper member is translatable in the front-back direction with respect to the lower member, the upper member is raiseable and lowerable with respect to the lower member, and the upper member is tiltable at various angles with respect to the lower member.

BRIEF DESCRIPTION OF DRAWINGS

Examples of seat support assemblies are described with reference to the following Figures. The same numbers are used throughout the Figures to reference like features and like components.

DETAILED DESCRIPTION

Figure 1:
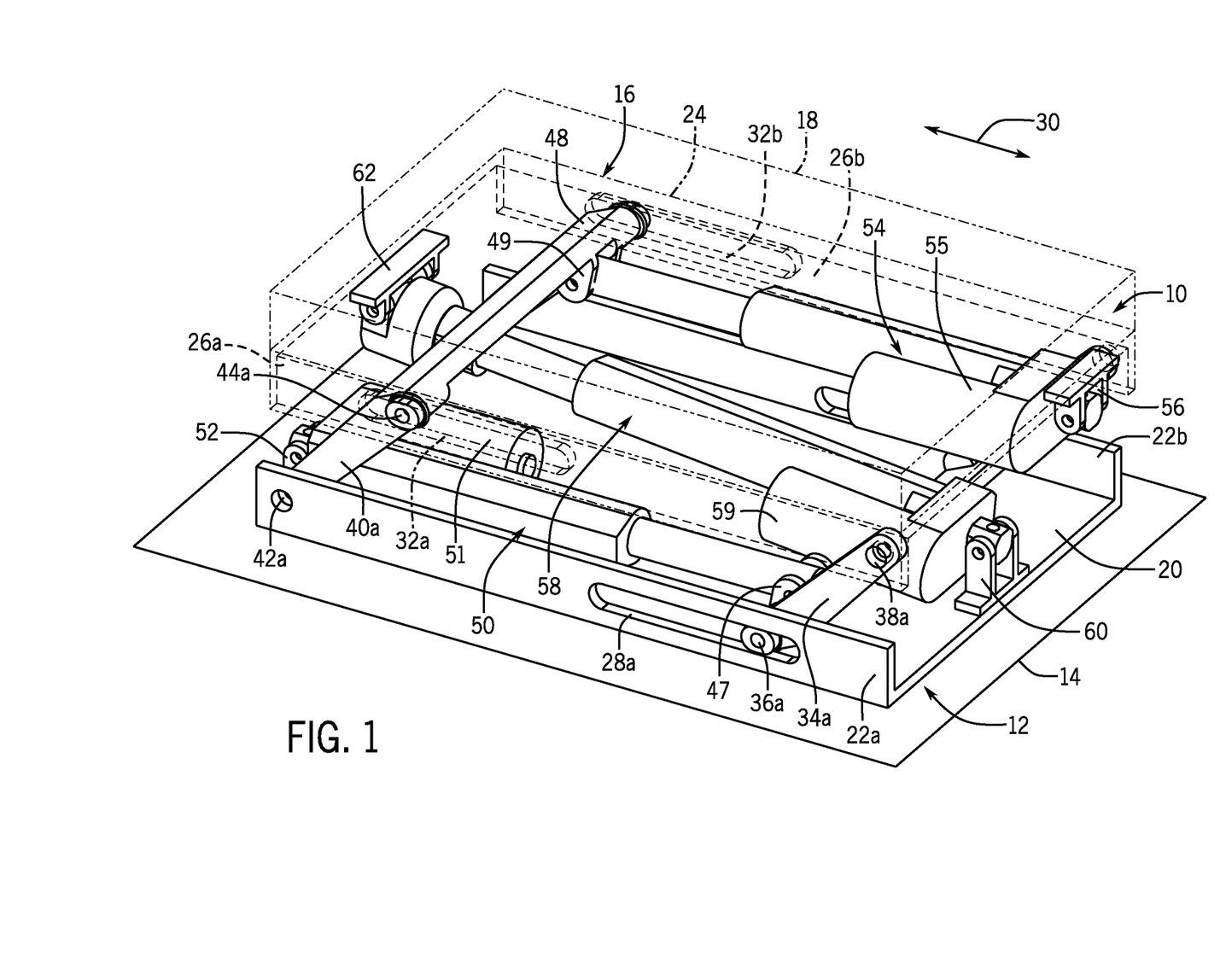
FIG. 1 illustrates a first side perspective view of a seat support assembly according to the present disclosure.
Figure 2:
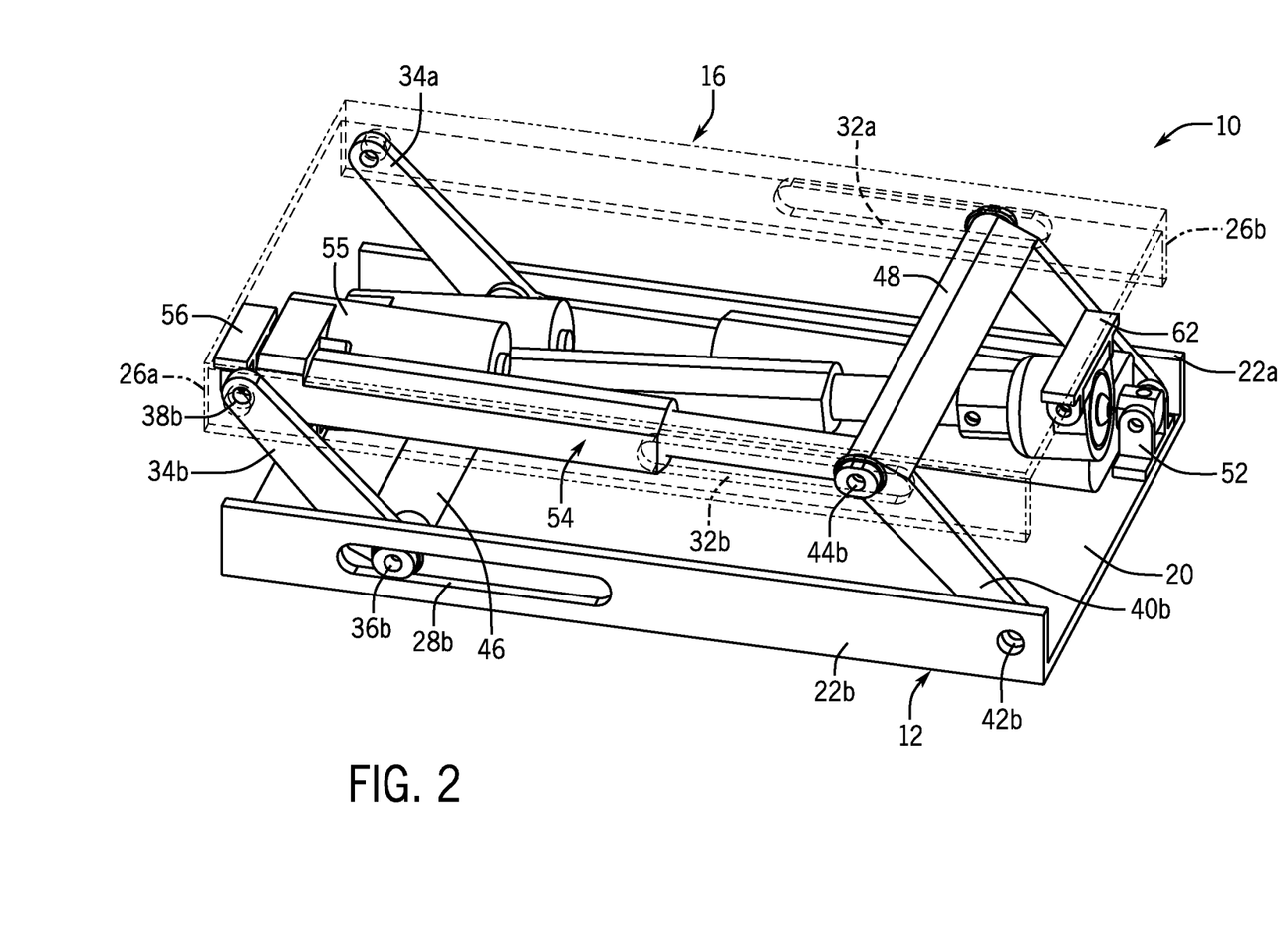
FIG. 2 illustrates an opposite side perspective view of the seat support assembly.

FIGS. 1 and 2 illustrate opposite side perspective views of a seat support assembly 10 for supporting a seat above a supporting surface, such as a floor of a vehicle or a deck of a marine vessel. The seat support assembly 10 includes a lower member 12 configured to be coupled to the supporting surface 14. The seat support assembly 10 also includes an upper member 16 positioned above the lower member 12 and configured to have a seat pan 18 coupled thereto. The lower member 12 can be coupled to the supporting surface 14 directly, as shown, such as by bolts, screws, welding and/or other known fastening mechanisms. Alternatively, a pedestal, mount, frame, and/or other device(s) may be provided to raise the lower member 12 above the supporting surface 14. In one example, a mechanism that allows the seat support assembly 10 to swivel with respect to the supporting surface 14 is provided below the lower member 12. Meanwhile, the seat pan 18 (which may be part of any type/design of appropriate seat) can be directly connected to the top of the upper member 16, as shown, such as by bolts, screws, welding and/or other known fastening mechanisms. Alternatively, intermediate components and/or assemblies can be provided between the upper member 16 and the seat pan 18.

The lower member 12 is shown as a rectangular plate 20 with upwardly extending sidewalls 22a, 22b on either lateral side thereof. Likewise, the upper member 16 is shown as a rectangular plate 24 with downwardly extending sidewalls 26a, 26b on either lateral side thereof. In other examples, the lower and upper members 12, 16 are not formed of rectangular plates 20, 24, respectively, but instead one or both of the lower and upper members 12, 16 can be an open frame or a single beam-like member. Although the lower and upper members 12, 16 are shown with opposing sidewalls 22a, 22b and 26a, 26b, respectively, in other examples, no sidewalls are provided and the lower and upper members 12, 16 comprise the plates 20, 24 only. In other examples, the sidewalls are present, but they are not at located the lateral edges of the plates 20, 24; instead, the sidewalls are spaced inwardly from the lateral edges of the plates 20, 24. In yet another example, the sidewalls extend downwardly from the plate 20 of the lower member 12 and/or upwardly from the plate 24 of the upper member 16. In general, the geometry of the lower and upper members 12, 16 is not important so long as they can accommodate the components required for raising and lowering the upper member 16, moving the upper member 16 in a front-back direction 30, and tilting the upper member 16, all as will be described further herein below.

Still referring to FIGS. 1 and 2, the lower member 12 comprises a first channel 28a extending in the front-back direction 30 of the seat support assembly 10 and a third channel 28b extending in the front-back direction 30 and spaced laterally from the first channel 28a. The upper member 16 comprises a second channel 32a extending in the front-back direction 30 and a fourth channel 32b extending in the front-back direction 30 and spaced laterally from the second channel 32a. Here, the channels 28a, 28b and 32a, 32b are slots formed in the sidewalls 22a, 22b and 26a, 26b, respectively. However, the channels could instead be depressions formed in the sidewalls 22a, 22b and 26a, 26b or slots or depressions formed in the plates 20, 24. In other examples, the channels are formed in brackets attached to the sidewalls 22a, 22b and 26a, 26b and/or plates 20, 24, or are formed by protrusions extending from the sidewalls 22a, 22b and 26a, 26b or plates 20, 24 that form tracks therealong. The channels can be any formation on or in the sidewalls 22a, 22b and 26a, 26b and/or plates 20, 24 that allows for sliding or rolling motion of another component therealong, for purposes described below.

The seat support assembly 10 also includes a first linkage 34a pivotably coupled to the lower and upper members 12, 16 and translatable with respect to at least one of (i.e., one or both of) the lower and upper members 12, 16 in the front-back direction 30 of the seat support assembly 10. More specifically, the first linkage 34a has a lower end pivotably coupled to the lower member 12 and translatable in the front-back direction 30 by way of the first channel 28a, and an upper end pivotably coupled to the upper member 16. The lower end of the first linkage 34a can be coupled to the sidewall 22a by way of a pin 36a or other type of fastener extending through the first channel 28a and into the lower end of the first linkage 34a. The pin 36a is sized and shaped to slide within the first channel 28a, and as the pin 36a does so, the lower end of the first linkage 34a translates along the first channel 28a. The upper end of the first linkage 34a can be coupled to the sidewall 26a of the upper member 16 by way of a pin 38a or other type of fastener. Although this pivot pin 38a is shown as being translationally fixed, and thus the upper end of the first linkage 34a is non-translatably pivotably coupled to the upper member 16, in other examples, a channel could be provided in the sidewall 26a to accommodate the pin 38a in a translatable manner. On the other lateral side of the seat support assembly 10, a third linkage 34b is provided, which has a lower end pivotably coupled to the lower member 12 and translatable in the front-back direction 30 by way of the third channel 28*b*, and an upper end pivotably coupled to the upper member 16. Such connections can be made to the sidewalls 22*b*, 26*b* respectively, by way of pins 36*b*, 38*b*, respectively, as described with respect to the first linkage 34*a*.

A second linkage 40*a* is also provided, which is pivotably coupled to the lower and upper members 12, 16 and translatable with respect to at least one of (i.e., one or both of) the lower and upper members 12, 16 in the front-back direction 30. More specifically, the second linkage 40*a* has a lower end pivotably coupled to the lower member 12 and an upper end pivotably coupled to the upper member 16 and translatable in the front-back direction 30 by way of the second channel 32*a*. On the opposite lateral side, the seat support assembly 10 comprises a fourth linkage 40*b* having a lower end pivotably coupled to the lower member 12 and an upper end pivotably coupled to the upper member 16 and translatable in the front-back direction 30 by way of the fourth channel 32*b*. The lower connections are made by way of pins 42*a*, 42*b* or other fasteners extending through the sidewalls 22*a*, 22*b*, respectively, and through respective lower ends of the second and fourth linkages 40*a*, 40*b*. Although these pivot pins 42*a*, 42*b* are shown as being translationally fixed, and thus the lower ends of the second and fourth linkages 40*a*, 40*b* are non-translatably pivotably coupled to the lower member 12, the pins 42*a*, 42*b* could instead be located in channels provided in the sidewalls 22*a*, 22*b*. The upper connections are made by way of pins 44*a*, 44*b* or other fasteners extending through channels 32*a*, 32*b*, respectively, and into respective upper ends of the second and fourth linkages 40*a*, 40*b*. The pins 44*a*, 44*b* are sized and shaped to slide within the channels 32*a*, 32*b*, respectively, such that the upper ends of the second and fourth linkages 40*a*, 40*b* can translate in the front-back direction 30 along the channels 32*a*, 32*b*.

In other examples, instead of using pins 36*a*, 36*b* and 44*a*, 44*b* or other fasteners to couple the linkages 34*a*, 34*b* and 40*a*, 40*b* to the channels 28*a*, 28*b* and 32*a*, 32*b*, respectively, the appropriate ends of the linkages 34*a*, 34*b* and 40*a*, 40*b* can be provided with integral protrusions that extend laterally outwardly from the linkages and are configured to be inserted in the channels 28*a*, 28*b* and 32*a*, 32*b*. Whether pins or integral protrusions are used, the pins or integral protrusions may be coated with or made of material having a low coefficient of friction and high durability. Alternatively, the surfaces of the channels 28*a*, 28*b* and 32*a*, 32*b* along which the pins or protrusions slide may be coated with a material having a low coefficient of friction and high durability.

Still referring to FIGS. 1 and 2, a lower crosspiece 46 couples the lower ends of the first and third linkages 34*a*, 34*b*, and an upper crosspiece 48 couples the upper ends of the second and fourth linkages 40*a*, 40*b*. The lower crosspiece 46 allows the lower ends of the first and third linkages 34*a*, 34*b* to translate together along the respective first and third channels 28*a*, 28*b*. Such movement can be provided, for example, by a lower actuator 50 coupled between the lower member 12 (e.g., at bracket 52) and the lower crosspiece 46 (e.g., at bracket 47). By way of connection to the lower crosspiece 46, the lower actuator 50 is configured to translate the first and third linkages 34*a*, 34*b* in the front-back direction 30 along the respective first and third channels 28*a*, 28*b*. Similarly, the upper crosspiece 48 allows the upper ends of the second and fourth linkages 40*a*, 40*b* to translate together along the respective second and fourth channels 32*a*, 32*b*. An upper actuator 54 is coupled between the upper member 16 (e.g., at bracket 56) and the upper crosspiece 48 (e.g., at bracket 49). By way of connection to the upper crosspiece 48, the upper actuator 54 is configured to translate the second and fourth linkages 40*a*, 40*b* in the front-back direction 30 along the respective second and fourth channels 32*a*, 32*b*. In another example, no lower crosspiece 46 is provided, and the first and third linkages 34*a*, 34*b* are controlled by separate actuators to translate together along the respective first and third channels 28*a*, 28*b*, such as by synchronizing the activation of the separate actuators. In another example, no upper crosspiece 48 is provided, and the second and fourth linkages 40*a*, 40*b* are controlled by separate actuators to translate together along the respective second and fourth channels 32*a*, 32*b*, such as by synchronizing the activation of the separate actuators.

A lifting actuator 58 is coupled between the lower member 12 and the upper member 16. The lifting actuator 58 is configured to raise and lower the upper member 16 with respect to the lower member 12. A first end of the lifting actuator 58 is coupled to the lower member 12 at the rear end thereof by way of a bracket 60 and pivots about a laterally-oriented pivot axis thereof. A second end of the lifting actuator 58 is coupled to the upper member 16 at a front end thereof by way of a bracket 62 and pivots about a laterally-oriented pivot axis thereof. (Although not shown herein, the brackets 60, 62 can be bolted, screwed, or otherwise attached to the respective lower and upper members 12, 16.) As such, both ends of the lifting actuator 58 are able to pivot so that the lifting actuator 58 can extend between the lower and upper members 12, 16 even as the upper member 16 raises or tilts upwardly away from the lower member 12. In the present example, the brackets 60, 62 are fixed in the front-back direction 30, but in other examples, one or both of the brackets 60, 62 could be translatable to allow the extension of the lifting actuator 58 to be more vertically-directed as the upper member 16 rises upwardly away from the lower member 12.

Each of the actuators 50, 54, 58 is shown as an electric linear actuator with an associated motor 51, 55, 59, respectively. The motors 51, 55, 59 are connected to a power source, such as a battery, and to one or more switches and/or a controller, as will be described further herein below, which allow current to flow from the power source to the motors 51, 55, 59 to activate the motors 51, 55, 59. As is known, when activated, the motors 51, 55, 59 drive the respective inner tubes of the actuators 50, 54, 58 in or out of the respective outer tubes thereof, thereby moving whatever component is connected to the clevis on the end of the inner tube. In other examples, the actuators 50, 54, 58 could be electric rack-and-pinion-type actuators or hydraulic actuators. In another example, the actuators 50, 54 associated with the translating pivots could be motors attached to lead screws that run through holes in the brackets 47, 49.

As will now be discussed with respect to FIGS. 3-14, by way of pivoting and/or translation of at least one of (i.e., one or both of) the first and second linkages 34*a*, 40*a* with respect to at least one of (i.e., one or both of) the lower and upper members 12, 16 (i.e., along the respective first and/or second channel 28*a*, 32*a*), the upper member 16 is translatable in the front-back direction 30 with respect to the lower member 12, the upper member 16 is raiseable and lowerable with respect to the lower member 12, and the upper member 16 is tiltable at various angles with respect to the lower member 12. Such varied motion is achievable in part because the first and second channels 28*a*, 32*a* (and corresponding third and fourth channels 28*b*, 32*b*) are offset from one another in the front-back direction 30 and in part because the first and second linkages 34*a*, 40*a* (and corresponding third and fourth linkages 34*b*, 40*b*) are offset from one another in the front-back direction 30 (in other words, at least in this example, the first and second linkages 34*a*, 40*a*—and third and fourth linkages 34*b*, 40*b*—do not cross in a scissors-like fashion.) Although the left side view of the seat support assembly 10 is shown in these examples, and thus only movement of the first and second linkages 34*a*, 40*a* along the first and second channels 28*a*, 32*a* will be described, it should be understood that the third and fourth linkages 34*b*, 40*b* move in parallel with the first and second linkages 34*a*, 40*a* along the respective third and fourth channels 28*b*, 32*b* on the right side of the seat support assembly 10 due to the connections provided by the lower crosspiece 46 and upper crosspiece 48, respectively, or the simultaneous activation of separate actuators for each linkage as described herein above. Note that in other examples, the linkages 34*a*, 40*a* may be designed to support the upper member 16 on their own, without provision of linkages 34*b*, 40*b*. In such examples, the linkages 34*a*, 40*a* may be provided towards the lateral centerlines of the lower and upper members 12, 16 and/or may be dimensioned more robustly in the lateral direction of the seat support assembly 10.

Figure 3:
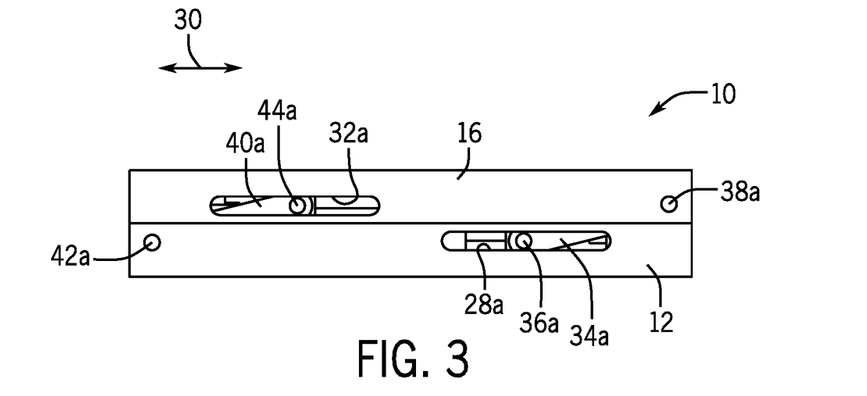
FIG. 3 illustrates a left side view of the seat support assembly in a centered position.
Figure 4:
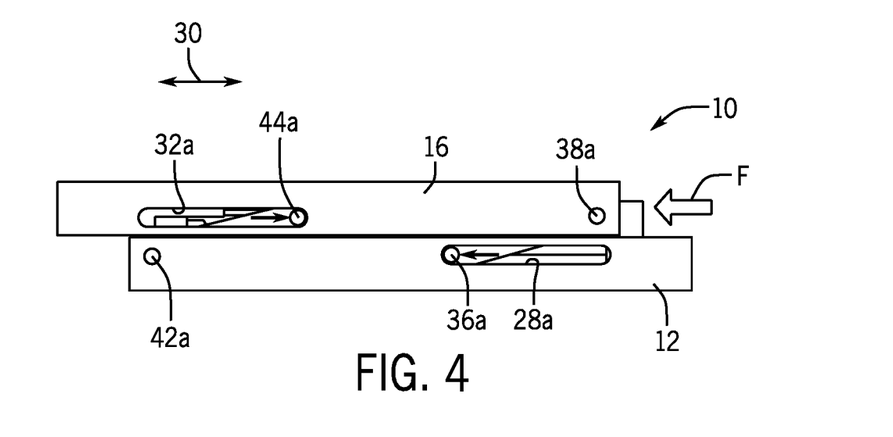
FIG. 4 illustrates a left side view of the seat support assembly in a slid-forward position.
Figure 5:
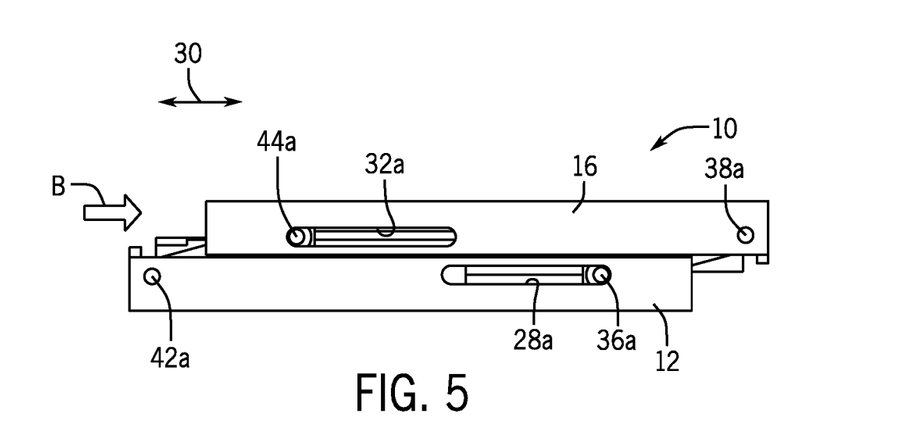
FIG. 5 illustrates a left side view of the seat support assembly in a slid-backward position.
Figure 6:
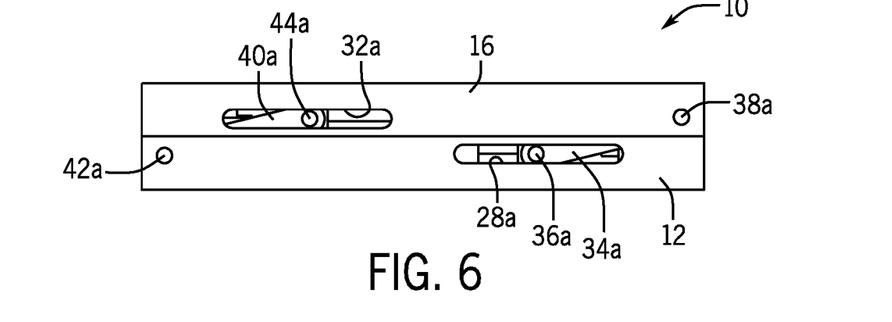
FIG. 6 illustrates a left side view of the seat support assembly in a fully lowered position.

FIGS. 3-5 show how the upper member 16 can be translated in the front-back direction 30 with respect to the lower member 12. In FIG. 3, the upper member 16 is centered above the lower member 12. The first linkage 34*a* is positioned such that its lower end is located about midway between the ends of the first channel 28*a*, as shown by location of pin 36*a*. When the upper member 16 is in this position, the lower actuator 50 may be in a partially extended position. Similarly, the upper end of the second linkage 40*a* is located about midway between the ends of the second channel 32*a*, as shown by location of pin 44*a*. When the upper member 16 is in this position, the upper actuator 54 may also be in a partially extended position.

To move the upper member 16 forward (with respect to the orientation of a seat coupled to the upper member 16), as shown in FIG. 4, the inner tube of the lower actuator 50 is retracted. This moves the pin 36*a* connected to lower end of the first linkage 34*a* as far to the front of the first channel 28*a* as possible, as shown by the arrow. At the same time, the inner tube of the upper actuator 54 is also retracted, which moves the pin 44*a* connected to the end of the second linkage 40*a* as far to the back of the second channel 32*a* as possible, as shown by the arrow. Such movement of the linkages 34*a*, 40*a* moves the upper member 16 forward, as shown by the arrow F. Also at the same time, the inner tube of the lifting actuator 58 is extended to prevent the upper member 16 from rising. Provided that the motors 51, 55 operate at the same speed and the motor 59 operates at a slightly slower speed, the actuators 50, 54, 58 can be actuated simultaneously and for the same length of time from the starting position shown in FIG. 3 in order to achieve this forward movement F without any tilting or upwards movement of the upper member 16 occurring at the same time. It should be understood that forward positions intermediate those shown in FIGS. 3 and 4 are possible by simultaneously retracting the lower and upper actuators 50, 54 for a shorter length of time.

In FIG. 5, the upper member 16 is moved backward, as shown by the arrow B. Such movement is achieved by extending the inner tube of the lower actuator 50 until the pin 36*a* connected to the lower end of the first linkage 34*a* reaches the back end of the first channel 28*a*, as shown by the arrow. Simultaneously, the inner tube of the upper actuator 54 is also extended until the pin 44*a* connected to the upper end of the second linkage 40*a* reaches the front end of the second channel 32*a*. The inner tube of the lifting actuator 58 is at the same time retracted to prevent the upper member 16 from rising. It should be understood that positions intermediate those shown in FIGS. 3 and 5 are possible by simultaneously extending the lower and upper actuators 50, 54 for a shorter length of time.

Thus, by way of the lower actuator 50 coupled between the lower member 12 and the first linkage 34*a*, the lower actuator 50 being configured to translate the first linkage 34*a* in the front-back direction 30 along the first channel 28*a*, and by way of the upper actuator 54 coupled between the upper member 16 and the second linkage 40*a*, the upper actuator 54 configured to translate the second linkage 40*a* in the front-back direction 30 along the second channel 32*a*, the upper member 16 is able to move in a front-back direction 30 with respect to the lower member 12, as shown in FIGS. 4 and 5.

FIG. 6 again shows the upper member 16 in a centered, non-raised position with respect to the lower member 12. This is achieved the same way as described with respect to FIG. 3, and therefore will not be discussed further herein. However, FIG. 6 is provided again for adjacent comparison with FIGS. 7 and 8.

Figure 7:
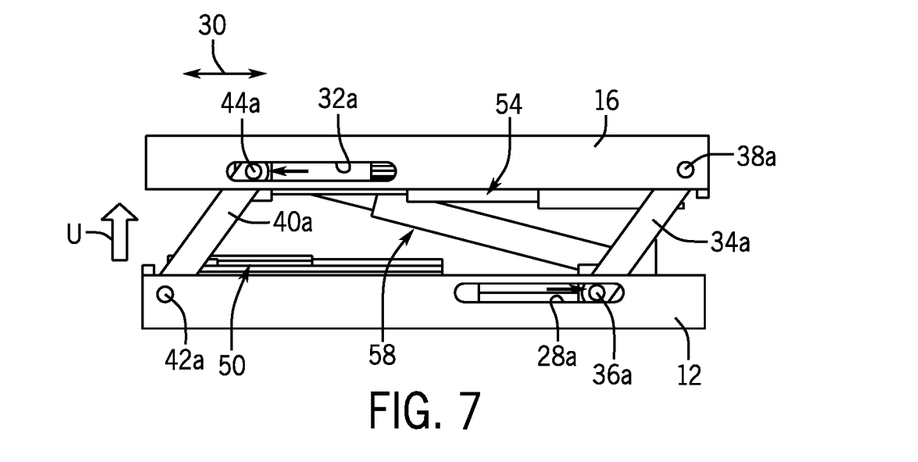
FIG. 7 illustrates a left side view of the seat support assembly in a raised position.

In FIG. 7, the upper member 16 is raised with respect to the lower member 12, but still centered in the front-back direction 30 with respect thereto. This is achieved by simultaneously extending the inner tubes of both the lower and upper actuators 50, 54, as shown by the arrows, while also extending the inner tube of the lifting actuator 58, which causes the upper member 16 to move in the direction of arrow U. The speed of the motor 59 on the lifting actuator 58 can be selected such that the upper member 16 rises vertically without also tilting or moving in the front-back direction 30. Thus, the upper member 16 is configured to be raised and lowered with respect to the lower member 12 without necessarily also translating in the front-back direction 30 with respect to the lower member 12. Alternatively, the upper member 16 can first be moved backward with respect to the lower member 12 (compare the positions of pivot pins 36*a*, 44*a* in FIGS. 5 and 7) and then the lifting actuator 58 can be extended to pivot the upper member 16 upwardly. It should be understood that intermediate raised positions are possible by extending the inner tubes of the actuators 50, 54, 58 to lesser extents than those shown in FIG. 7.

Figure 8:
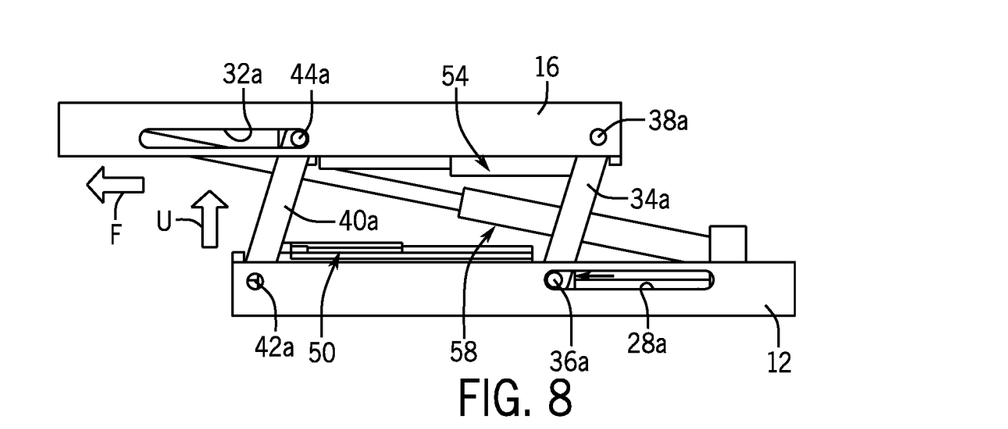
FIG. 8 illustrates a left side view of the seat support assembly in a raised and slid-forward position.
Figure 9:
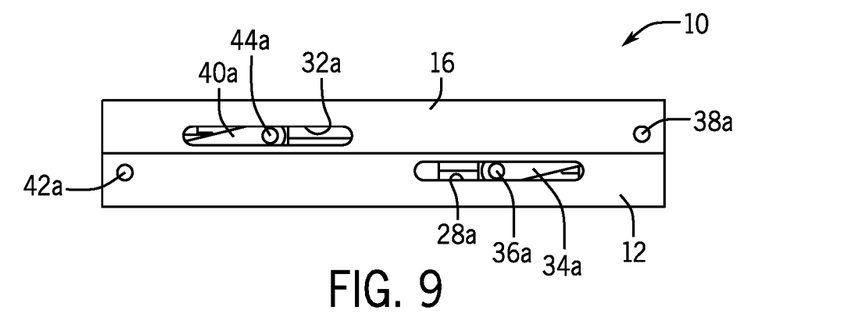
FIG. 9 illustrates a left side view of the seat support assembly in a non-tilted position.

FIG. 8 shows the upper member 16 raised and moved forward with respect to the lower member 12. This can be done after the upper member 16 has been raised to the position shown in FIG. 7 as described with respect thereto, by retracting the inner tube of the lower actuator 50 and the inner tube of the upper actuator 54 at the same time, as shown by the arrows, until the pin 36*a* connected to the lower end of the first linkage 34*a* is at the front end of the first channel 28*a* and the pin 44*a* connected to the upper end of the second linkage 40*a* is at the back end of the second channel 32*a*. Alternatively, the position of FIG. 8 could be achieved directly from the starting position of FIG. 6 by retracting the inner tube of the lower actuator 50 and the inner tube of the upper actuator 54 to move the upper member 16 in the direction of arrow F, while at the same time extending the inner tube of the lifting actuator 58 to move the upper member in the direction of the arrow U. Again, the motor speeds could be chosen to achieve a smooth transition from the position of the upper member 16 shown in FIG. 6 to the position of the upper member shown in FIG. 8. Further, those of ordinary skill in the art would understand that intermediate raised and forward positions are possible by activating the motors 51, 55, 59 of the actuators 50, 54, 58 for shorter lengths of time.

FIG. 9 again shows the upper member 16 in a centered, non-raised, non-tilted position with respect to the lower member 12. This is achieved the same way as described with respect to FIG. 3, and therefore will not be discussed further herein. However, FIG. 9 is provided again for adjacent comparison with FIGS. 10 and 11.

Figure 10:
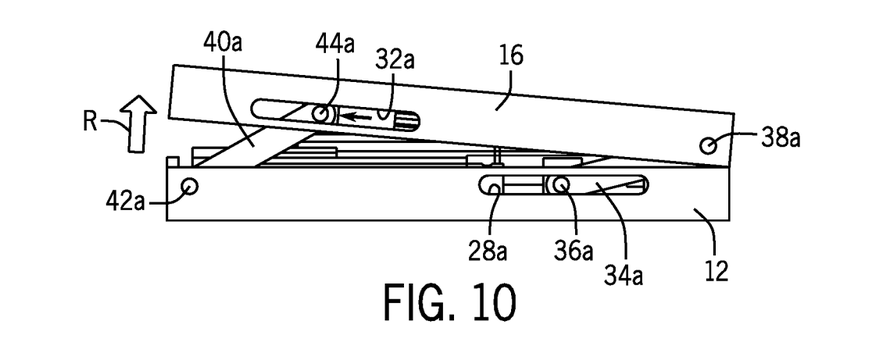
FIG. 10 illustrates a left side view of the seat support assembly in a reclined position.

FIG. 10 shows the upper member 16 in a tilted/reclined position with respect to the lower member 12. This is achieved by not actuating the lower actuator 50 from the position of FIG. 9, but extending the inner tube of the upper actuator 54 in the direction of the arrow, as shown by the pin 44a connected to the upper end of the second linkage 40a being moved further toward the front end of the second channel 32a than in FIG. 9. The inner tube of the lifting actuator 58 is simultaneously extended to lift the front end of the upper member 16 off the lower member 12, and the upper member 16 is thus reclined in the direction of arrow R. It should be understood that the upper member 16 can be reclined more or less than shown herein by more or less extension of the inner tubes of the actuators 54, 58.

Figure 11:
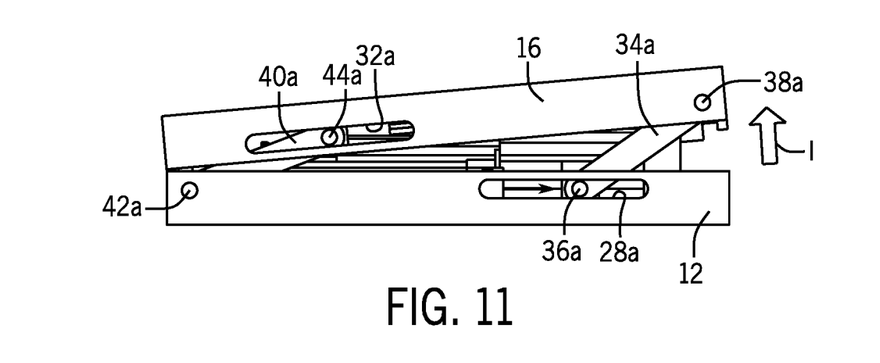
FIG. 11 illustrates a left side view of the seat support assembly in an inclined position.

FIG. 11, in contrast, shows the upper member 16 in a tilted/inclined position with respect to the lower member 12. This is achieved by extending the inner tube of the lower actuator 50 in the direction of the arrow, as shown by the pin 36a connected to the lower end of the first linkage 34a being more toward the back end of the first channel 28a than in FIG. 9, but not activating the upper actuator 54 from the position shown in FIG. 9. Because the front end of the upper member 16, to which the lifting actuator 58 is coupled, does not move much, it may not be necessary to activate the lifting actuator 58, as pivoting thereof about the pivot axes of brackets 60, 62 may provide enough movement to accommodate the incline movement (arrow I) of the back end of the upper member 16. In other examples, the lifting actuator 58 may be actuated slightly to accommodate any increased dimension between the front end of the upper member 16 and the back end of the lower member 12 that results from the inclined movement. It should be understood that the upper member 16 can be inclined more or less than shown herein by more or less extension of the inner tube of the actuator 50.

Figure 12:
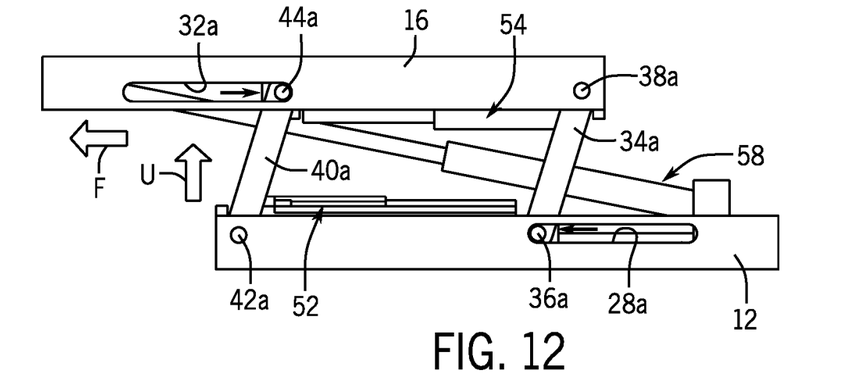
FIG. 12 illustrates a left side view of the seat support assembly in the raised and slid-forward position, similar to FIG. 8.

FIG. 12 shows the upper member 16 in a raised and forward position with respect to the lower member 12, which can be achieved as described herein above with respect to FIG. 8. However, FIG. 12 is provided again for adjacent comparison with FIGS. 13 and 14.

Figure 13:
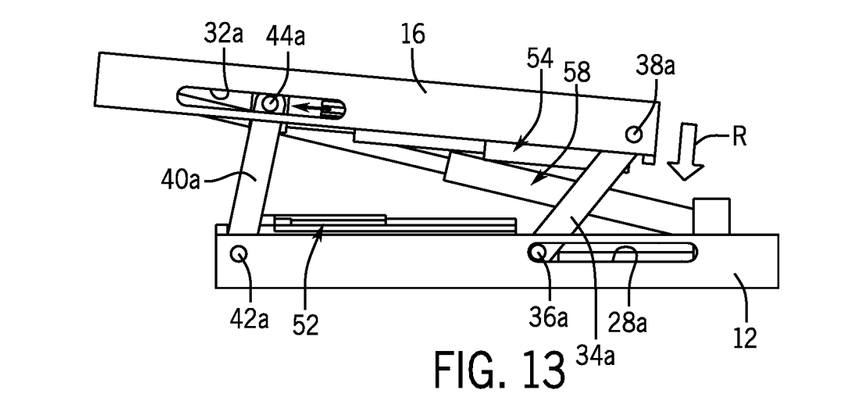
FIG. 13 illustrates a left side view of the seat support assembly in a raised, slid-forward, and reclined position.

FIG. 13 shows the upper member 16 in a raised, forward, and reclined position with respect to the lower member 12. Such a position can be achieved from the position shown in FIG. 12 by extending the inner tube of the upper actuator 54 as shown by the arrow, as can be seen by the upper pin 44a moving forward within the second channel 32a with respect to the position shown in FIG. 12. The lower actuator 50 is not actuated. Simultaneously, the inner tube of the lifting actuator 58 may be extended slightly to accommodate the increased dimension between the front end of the upper member 16 and the back end of the lower member 12. The upper member 16 thus reclines as shown by arrow R.

Figure 14:
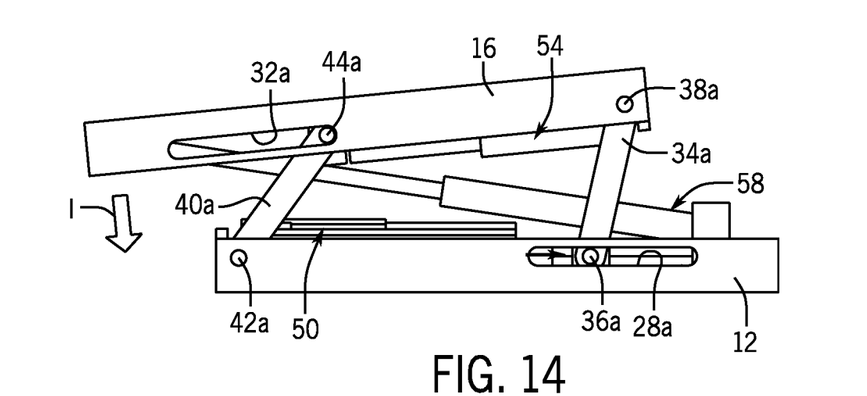
FIG. 14 illustrates a left side view of the seat support assembly in a raised, slid-forward, and inclined position.

Alternatively, starting from the position shown in FIG. 12, the inner tube of the lower actuator 50 can be extended to move the lower end of the first linkage 34a backward, as shown by the arrow and by the pin 36a being further toward the back end of the first channel 28a than in FIG. 12. The upper actuator 54 is not actuated, but the inner tube of the lifting actuator 58 may be simultaneously retracted slightly to account for the decreased dimension between the front end of the upper member 16 and the back end of the lower member 12. The upper member 16 therefore inclines in the direction of arrow I.

Thus, by way of a lower end of the first linkage 34a being pivotably and translatably coupled to the lower member 12, and an upper end of the second linkage 40a being pivotably and translatably coupled to the upper member 16, the upper member 16 is able not only to translate in the front-back direction 30 as shown in FIGS. 4 and 5, but also to be raised and lowered and tilted (or combinations of the above) with respect to the lower member 12, as shown in FIGS. 7, 8, and 10-14.

Through research and development, the present inventor has discovered that there is a need for a low-profile seat riser and slide system that additionally allows the seat to incline and recline. By way of a four-bar linkage assembly (comprised of the lower member 12, upper member 16, and first and second linkages 34a, 40a), the present seat support assembly 10 allows for the upper member 16 to rise with respect to the lower member 12, while the translating pivots (at pins 36a, 44a) move to counteract the forward or backward movement that would otherwise inherently result from such a four-bar linkage. The translating pivots also allow the upper member 16 to slide forward and backward with respect to the lower member 12, without the upward or downward motion that would otherwise be inherent in a four-bar linkage with four fixed pivot points. By way of pivot translation and raising the upper member 16 away from the lower member 12, tilted positions are also possible. This is in contrast to known four-bar linkages for seat support assemblies, which have fixed pivots and can raise and lower the seat in an arced fashion, but require a separate mechanism to slide the seat forward and backward and do not allow for tilt. This is also in contrast to scissors-style seat support assemblies, some of which have translating pivots at adjacent ends of the upper and lower members to allow for vertical rise, but which do not allow for slide or tilt.

Note that the locations and extents of the channels 28a, 28b and 32a, 32b are for exemplary purposes only. In another example, pivotable and translatable couplings are provided between the first and third linkages 34a, 34b and the upper member 16 (instead of the lower member 12, as shown), along with pivotable and translatable couplings provided between the second and fourth linkages 40a, 40b and the lower member 12 (instead of the upper member 16, as shown). In another example, all of the couplings between the linkages and the lower and upper members are both pivotable and translatable. Furthermore, the extent of the channels can vary, and it is contemplated that the first linkage 34a is translatable in the front-back direction 30 along a portion of the lower member 12, and the second linkage 40a is translatable in the front-back direction 30 along a portion of the upper member 16. The portions of the lower and upper members 12, 16 along which the linkages 34a, 40a are translatable can be offset from one another in the front-back direction 30 (i.e., one at the front end of the seat supporting assembly 10 and one at the back end thereof) in order to allow for the movement of the linkages 34a, 40a as described herein above to achieve the positions of the upper member 16 shown in FIGS. 3-14. In the present example, the portion of the lower member 12 is a channel 28a formed in the lower member 12, and the portion of the upper member 16 is a channel 32a formed in the upper member 16. However, in other examples, the translatable ends of the linkages may be provided with rollers, bearings, casters, or other slidable or rollable devices that allow them to move with respect to the lower and upper members 12, 16.

In some examples, a shock absorbing assembly is coupled between the lower member 12 and the first linkage 34*a* and/or the upper member 16 and the second linkage 40*a*. For example, the shock absorber could be an air spring located side-by side with the upper and/or lower actuator 50, 54, or the upper and/or lower actuator 50, 54 could be provided with a spring thereabout to form a coilover shock absorber. In another example, if the actuators are hydraulic, they could be filled with a magnetorheological fluid that changes viscosity upon application of an electromagnetic field that varies based on sensed ride conditions.

In some examples, the different positions of the upper member 16 with respect to the lower member 12 can be tied to operating conditions of a vehicle or marine vessel in which the seat support assembly 10 is installed. Doing so may require installing a controller that receives signals from sensors onboard the vehicle or vessel that provide the controller with information, such as, but not limited to, whether a key is present in the ignition, whether the engine/motor is started, the speed of the vehicle/vessel, the acceleration of the vehicle/vessel, the inclination/pitch of the vehicle/vessel, the global position of the vehicle/vessel, and/or whether a passenger is sitting in the seat. The controller would also be connected to and would control the actuators 50, 54, 58 in response to one or more sensed vehicle/vessel conditions. For instance, the position in FIG. 5 could be automatically commanded when the vehicle/vessel is off and/or not moving, while the position of FIG. 4 could be automatically commanded when the engine/motor is turned on and/or a weight of a passenger is sensed. The position of FIG. 14 might be automatically commanded for a seat on a marine vessel when the vessel is docking (as determined by GPS position and/or boat speed and/or use of a joystick) or when the marine vessel's bow is raised. The position of FIG. 10 could be automatically commanded for a seat on a marine vessel when the engine/motor is off, but the weight of a passenger is still sensed in the seat and/or the key remains in the ignition for longer than a predetermined period of time after the engine/motor is stopped.

Additionally or alternatively, the positions in FIGS. 3-14 can be commanded by the operator using one or more input devices, such as switches, buttons, a keypad, or a touchscreen on the vehicle/vessel or on the passenger's handheld device. If a single user input device is provided, it can be connected to a controller that is then connected to each of the motors 51, 55, 59 of the actuators 50, 54, 58. On the other hand, if separate user input devices are provided for each movement (forward/backward, raise/lower, recline/incline), the switches can be hardwired to the appropriate motors 51, 55, 59 of the actuators 50, 54, 58.

In the present description, certain terms have been used for brevity, clarity, and understanding. No unnecessary limitations are to be implied therefrom beyond the requirement of the prior art because such terms are used for descriptive purposes only and are intended to be broadly construed. The different components and assemblies described herein may be used or sold separately or in combination with other components and assemblies. Various equivalents, alternatives, and modifications are possible within the scope of the appended claims.

What is claimed is:

1. A seat support assembly comprising:
    a lower member comprising a first channel extending in a front-back direction of the seat support assembly;
    an upper member positioned above the lower member and comprising a second channel extending in the front-back direction;
    a first linkage having a lower end pivotably coupled to the lower member and translatable in the front-back direction by way of the first channel, and an upper end pivotably coupled to the upper member; and
    a second linkage having a lower end pivotably coupled to the lower member, and an upper end pivotably coupled to the upper member and translatable in the front-back direction by way of the second channel;
    wherein the first and second channels are offset from one another in the front-back direction; and
    wherein by way of pivoting and/or translation of the first and/or second linkage along the respective first and/or second channel, the upper member is translatable in the front-back direction with respect to the lower member, the upper member is raiseable and lowerable with respect to the lower member, and the upper member is tiltable at various angles with respect to the lower member.

2. The seat support assembly of claim 1, wherein the lower member comprises a third channel extending in the front-back direction and spaced laterally from the first channel, and the upper member comprises a fourth channel extending in the front-back direction and spaced laterally from the second channel, and the seat support assembly further comprises:
    a third linkage having a lower end pivotably coupled to the lower member and translatable in the front-back direction by way of the third channel, and an upper end pivotably coupled to the upper member;
    a fourth linkage having a lower end pivotably coupled to the lower member, and an upper end pivotably coupled to the upper member and translatable in the front-back direction by way of the fourth channel;
    a lower crosspiece coupling the lower ends of the first and third linkages; and
    an upper crosspiece coupling the upper ends of the second and fourth linkages.

3. The seat support assembly of claim 2, further comprising:
    a lower actuator coupled between the lower member and the lower crosspiece, the lower actuator configured to translate the first and third linkages in the front-back direction along the respective first and third channels; and
    an upper actuator coupled between the upper member and the upper crosspiece, the upper actuator configured to translate the second and fourth linkages in the front-back direction along the respective second and fourth channels.

4. The seat support assembly of claim 1, further comprising:
    a lower actuator coupled between the lower member and the first linkage, the lower actuator configured to translate the first linkage in the fore-aft direction along the first channel; and
    an upper actuator coupled between the upper member and the second linkage, the upper actuator configured to translate the second linkage in the fore-aft direction along the second channel.

5. The seat support assembly of claim 1, further comprising an actuator coupled between the lower member and the upper member, the actuator configured to raise and lower the upper member with respect to the lower member.

6. The seat support assembly of claim 1, wherein the upper end of the first linkage is non-translatably pivotably coupled to the upper member and the lower end of the second linkage is non-translatably pivotably coupled to the lower member.

7. The seat support assembly of claim 1, wherein the first and second linkages are offset from one another in the fore-aft direction.

8. The seat support assembly of claim 1, wherein the lower member is configured to be coupled to a supporting surface and the upper member is configured to have a seat pan coupled thereto.

9. A seat support assembly comprising:
a lower member configured to be coupled to a supporting surface;
an upper member configured to have a seat pan coupled thereto;
a first linkage pivotably coupled to the lower and upper members and translatable with respect to the lower and/or upper member in a front-back direction of the seat support assembly;
a second linkage pivotably coupled to the lower and upper members and translatable with respect to the lower and/or upper member in the front-back direction; and
an actuator coupled between the lower member and the upper member, the actuator configured to raise and lower the upper member with respect to the lower member;
wherein by way of pivoting and/or translation of the first and/or second linkage with respect to the lower and/or upper member, the upper member is translatable in the front-back direction with respect to the lower member, the upper member is raiseable and lowerable with respect to the lower member, and the upper member is tiltable at various angles with respect to the lower member.

10. A seat support assembly comprising:
a lower member configured to be coupled to a supporting surface;
an upper member configured to have a seat pan coupled thereto;
a first linkage pivotably coupled to the lower and upper members and translatable with respect to the lower and/or upper member in a front-back direction of the seat support assembly; and
a second linkage pivotably coupled to the lower and upper members and translatable with respect to the lower and/or upper member in the front-back direction;
wherein by way of pivoting and/or translation of the first and/or second linkage with respect to the lower and/or upper member, the upper member is translatable in the front-back direction with respect to the lower member, the upper member is raiseable and lowerable with respect to the lower member, and the upper member is tiltable at various angles with respect to the lower member; and
wherein the first linkage is translatable in the front-back direction along a portion of the lower member, and the second linkage is translatable in the front-back direction along a portion of the upper member, the portions of the lower and upper members being offset from one another in the front-back direction.

11. The seat support assembly of claim 10, wherein the upper member is configured to be raised and lowered with respect to the lower member without necessarily also translating in the front-back direction with respect to the lower member.

12. The seat support assembly of claim 10, wherein the portion of the lower member is a channel formed in the lower member, and the portion of the upper member is a channel formed in the upper member.

13. The seat support assembly of claim 10, further comprising:
a lower actuator coupled between the lower member and the first linkage, the lower actuator configured to translate the first linkage in the front-back direction with respect to the lower member; and
an upper actuator coupled between the upper member and the second linkage, the upper actuator configured to translate the second linkage in the front-back direction with respect to the upper member.

14. The seat support assembly of claim 10, wherein an upper end of the first linkage is non-translatably pivotably coupled to the upper member, and a lower end of the second linkage is non-translatably pivotably coupled to the lower member.

15. The seat support assembly of claim 10, further comprising an actuator coupled between the lower member and the upper member, the actuator configured to raise and lower the upper member with respect to the lower member.

16. The seat support assembly of claim 10, wherein the first and second linkages are offset from one another in the fore-aft direction.

17. A seat support assembly comprising:
a lower member configured to be coupled to a supporting surface;
an upper member configured to have a seat pan coupled thereto;
a first linkage pivotably coupled to the lower and upper members and translatable with respect to the lower and/or upper member in a front-back direction of the seat support assembly; and
a second linkage pivotably coupled to the lower and upper members and translatable with respect to the lower and/or upper member in the front-back direction;
wherein by way of pivoting and/or translation of the first and/or second linkage with respect to the lower and/or upper member, the upper member is translatable in the front-back direction with respect to the lower member, the upper member is raiseable and lowerable with respect to the lower member, and the upper member is tiltable at various angles with respect to the lower member; and
wherein an upper end of the first linkage is non-translatably pivotably coupled to the upper member, and a lower end of the second linkage is non-translatably pivotably coupled to the lower member.

18. The seat support assembly of claim 17, wherein a lower end of the first linkage is pivotably and translatably coupled to the lower member, and an upper end of the second linkage is pivotably and translatably coupled to the upper member.

19. A seat support assembly comprising:
a lower member comprising a first channel extending in a front-back direction of the seat support assembly;
an upper member positioned above the lower member and comprising a second channel extending in the front-back direction;
a first linkage having a lower end pivotably coupled to the lower member and translatable in the front-back direction by way of the first channel, and an upper end pivotably coupled to the upper member; and
a second linkage having a lower end pivotably coupled to the lower member, and an upper end pivotably coupled to the upper member and translatable in the front-back direction by way of the second channel;

wherein the first and second channels are offset from one another in the front-back direction;

wherein the lower member comprises a third channel extending in the front-back direction and spaced laterally from the first channel, and the upper member comprises a fourth channel extending in the front-back direction and spaced laterally from the second channel, and the seat support assembly further comprises:

a third linkage having a lower end pivotably coupled to the lower member and translatable in the front-back direction by way of the third channel, and an upper end pivotably coupled to the upper member;

a fourth linkage having a lower end pivotably coupled to the lower member, and an upper end pivotably coupled to the upper member and translatable in the front-back direction by way of the fourth channel;

a lower crosspiece coupling the lower ends of the first and third linkages; and an upper crosspiece coupling the upper ends of the second and fourth linkages.

20. A seat support assembly comprising:

a lower member comprising a first channel extending in a front-back direction of the seat support assembly;

an upper member positioned above the lower member and comprising a second channel extending in the front-back direction;

a first linkage having a lower end pivotably coupled to the lower member and translatable in the front-back direction by way of the first channel, and an upper end pivotably coupled to the upper member;

a second linkage having a lower end pivotably coupled to the lower member, and an upper end pivotably coupled to the upper member and translatable in the front-back direction by way of the second channel;

a lower actuator coupled between the lower member and the first linkage, the lower actuator configured to translate the first linkage in the fore-aft direction along the first channel; and an upper actuator coupled between the upper member and the second linkage, the upper actuator configured to translate the second linkage in the fore-aft direction along the second channel;

wherein the first and second channels are offset from one another in the front-back direction.

21. A seat support assembly comprising:

a lower member configured to be coupled to a supporting surface;

an upper member configured to have a seat pan coupled thereto;

a first linkage pivotably coupled to the lower and upper members and translatable with respect to the lower and/or upper member in a front-back direction of the seat support assembly;

a second linkage pivotably coupled to the lower and upper members and translatable with respect to the lower and/or upper member in the front-back direction;

a lower actuator coupled between the lower member and the first linkage, the lower actuator configured to translate the first linkage in the front-back direction with respect to the lower member; and an upper actuator coupled between the upper member and the second linkage, the upper actuator configured to translate the second linkage in the front-back direction with respect to the upper member;

wherein by way of pivoting and/or translation of the first and/or second linkage with respect to the lower and/or upper member, the upper member is translatable in the front-back direction with respect to the lower member, the upper member is raiseable and lowerable with respect to the lower member, and the upper member is tiltable at various angles with respect to the lower member.

\* \* \* \* \*